Aug. 22, 1961 D. F. KUDNER 2,997,331
VEHICLE GUARD PARTITION
Filed Feb. 21, 1958
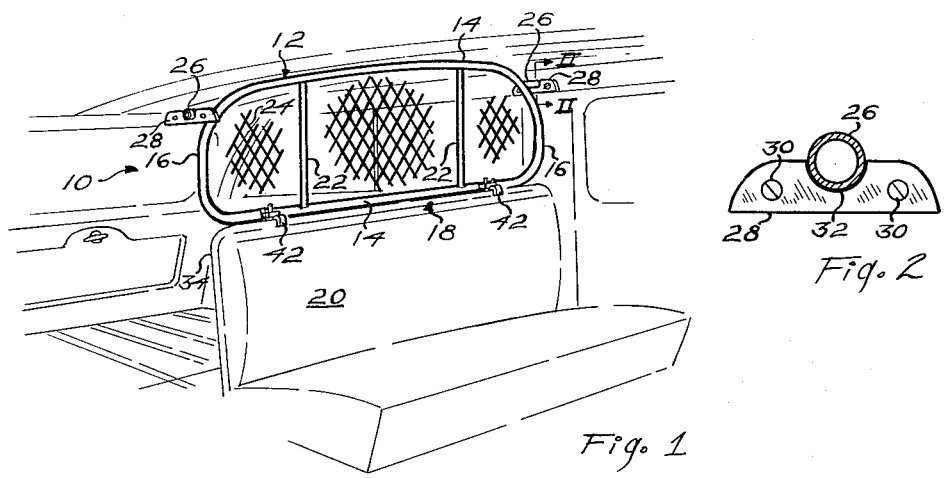
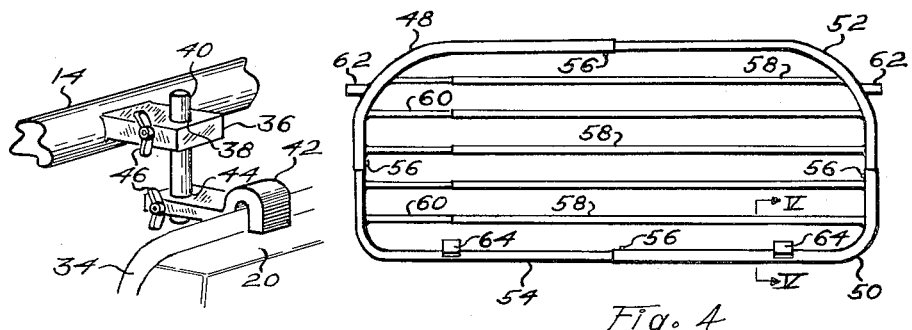
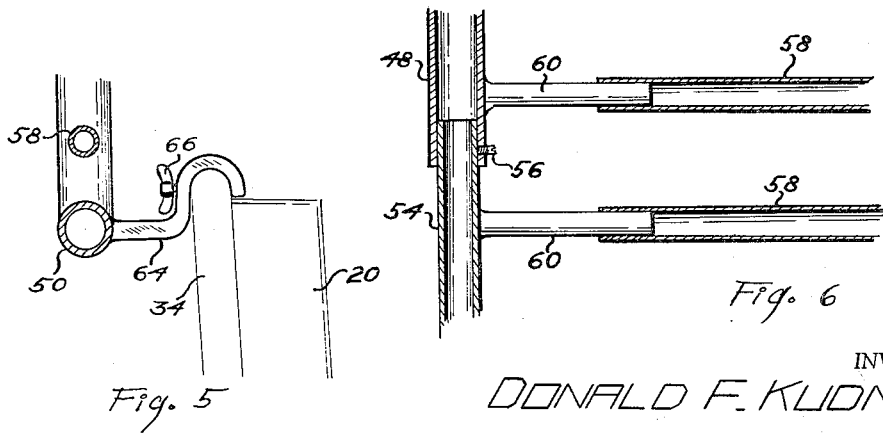
INVENTOR
DONALD F. KUDNER
BY Beaman & Beaman
ATTORNEY

United States Patent Office 2,997,331
Patented Aug. 22, 1961

2,997,331
VEHICLE GUARD PARTITION
Donald F. Kudner, 1300 W. Franklin St., Jackson, Mich.
Filed Feb. 21, 1958, Ser. No. 716,697
3 Claims. (Cl. 296—24)

The invention relates to a vehicle partition and particularly pertains to a screen for defining a compartment within a station wagon.

The versatility of the station wagon automobile is well known and the open interior and folding rear seats provide a usable capacity for transportation much greater than the conventional passenger automobile. However, the open interior construction has disadvantages in the transporting of dogs, as for a hunting trip, as the dogs may climb over the rear seat and otherwise annoy the passengers resulting in an unpleasant and unsafe condition.

It is thus an object of the invention to provide a vehicle partition which may be used to confine dogs or other animals to the areas behind the seats of a station wagon and which may easily be installed or removed.

Another object of the invention is to provide a vehicle partition which may be installed in a vehicle with little modification of the vehicle and which will not affect the visibility within the vehicle.

Yet another object of the invention is to provide a vehicle partition which may be economically manufactured, easily assembled and may be installed in all current vehicles without modification regardless of interior dimensional differences.

A further object of the invention is to provide a vehicle partition which utilizes the seat frame structure for support and which is attractive and pleasing in design.

These and other objects of the invention will become apparent when viewed with regard to the following description and accompanying drawings wherein:

FIG. 1 is a perspective view of one form of the invention installed in an automobile, FIG. 2 is a detail view of the hangers used to support the upper portion of the partition taken on II—II of FIG. 1, FIG. 3 is a perspective view of one type of lower clamps which may be used with the partition of FIG. 1, FIG. 4 is an elevational view of another type of partition which is adjustable both in height and width, FIG. 5 is an elevational view of a type of lower clamps which may be used with the partition of FIG. 4, and FIG. 6 is a cross section detail of a portion of the partition of FIG. 4 illustrating construction details.

Referring to FIG. 1, it will be observed that the partition 10 may be used to enclose the area behind the middle seat of a station wagon type automobile and is expected to find the greatest use in this application, however, the partition may also be used in conjunction with the front seat of a station wagon, conventional auto or panel truck.

The partition consists of a frame 12 composed of upper and lower sides 14 and vertical end members 16. The upper side 14 is preferably bowed outwardly slightly to conform to the curve of the roof panels of the modern automobile and the lower side 14 is straight so as to be parallel to the backing support 18 of the backrest seat cushion 20. The end members 16 are preferably straight, however, the junction of the sides 14 and end 16 is formed by a gentle bend to conform to the auto body configuration and produce an attractive and pleasing appearance. The frame 12 may be made from a single length of pipe or tube and butt welded at the junction of the tube ends. A pair of braces 22 may be used to connect the side members 14 to provide strength to the frame.

The frame 12 is covered with a screen material 24 which actually forms the partition means. The screen 24 may be constructed of any desired pattern such as woven wire, expanded metal etc. and welded or bolted to the frame, however as large a mesh as possible is used which will prevent the dogs from annoying the passengers seated on the middle seat as unnecessarily small mesh will impair rearward visibility within the vehicle.

A pair of horizontally projecting ears 26 are affixed to the frame, preferably to the end members 16, to support the weight of the partition. Ears 26 are of tubular cross section, note FIG. 2, and are adapted to rest on brackets 28 which are affixed to the interior of the vehicle. The brackets 28 are constructed of flat stock and are of relatively small and unobtrusive size as they are permanently attached to the interior of the vehicle by a pair of screws 30 or the like. The upper edge of the brackets is formed with a recess 32 which is complementary in size and shape to the ears 26 which rest within the recess 32 and will be maintained therein by the weight of the partition.

The lower end of the partition 10 is positioned by means of clamps cooperating with the backrest seat support. In usual station wagon construction the middle seat is hinged so as to fold into the floor and the backrest cushion support is a rigid panel constituting a portion of the floor when the seat is in the folded position and it is to this rigid panel or backrest support, designated 34 in the drawings, that the lower partition clamps are affixed.

Since the partition of the invention is to be used with many makes of vehicles having various interior dimensions the distances from the vehicle roof upholstery to the top of backing 34 will differ necessitating a pair of clamps having vertical adjustment means and by way of illustration one type of clamps which may be used is shown in FIG. 3. A horizontally extending boss 36 is welded to the front edge of lower side member 14 and is provided with a hole 38 through which the rod 40 projects and is axially adjustable. A clamp 42 is formed with a U shape configuration which may slip over the edge of backing 34 and a hole 44 through which rod 40 is also slidably received. Set screws 46, provided with winged heads, are screwed into threaded bores within boss 36 and adapter 42 which intersect holes 38 and 44, respectively, and rod 40 thereby permitting the vertical distance between boss 36 and clamps 42 to be adjustably varied and maintained. Should the distance from the top of backing 34 to the roof be such that the boss 36 would have to be lower than clamp 42 such relation is easily accomplished by the illustrated connection.

When the partition is initially installed in a given vehicle the position of clamp 42 is adjusted such that the clamp firmly engages the edge of backing 34 when the ears 26 fully rest in the recess 32 of brackets 28. Once adjusted it is not necessary to relocate the clamp 42 each time the partition is installed as installation may be accomplished by merely simultaneously aligning ears 26 with recesses 32 and the clamp 42 with the backing edge and lowering the frame 12 in place. The weight of the partition is sufficient to maintain the engagement of the ears and brackets and clamps and seat backing and dogs or other animals which may be located in the rear of the vehicle are effectively restrained to that part of the vehicle and cannot intrude into the passenger section. The screen 24 is of sufficient large mesh to prevent rearward visibility from being impaired and the slender configuration of the partition framework likewise will not noticeably reduce rear vision.

A modification of the partition of the invention is disclosed in FIG. 4. The partition of FIG. 4 is constructed such that the frame itself is adjustable and may be adapted to most vehicle dimensions without the use of adjustable supporting clamps. The frame of the modification consists of a pair of tubular members 48 and 50 formed with a gradual 90° bend. A pair of tubular insert members 52 and 54 are likewise formed with 90° bends and the outside diameter of the inerts 52 and 54 are slightly less than the inside diameter of members 48 and 50 whereby the inserts may telescopingly engage the larger tubular members providing relative axial adjustment between the engaging frame members. The larger members 48 and 50 are provided with set screws 56 which contact the insert members 52 and 54 and will be tightened once the desired adjustment is obtained.

The framework is spanned by a series of parallel telescoping ribs composed of large tubular ribs 58 and smaller insert rib members 60. The rib members 58 and 60 are welded or brazed to the frame members 48—54 and it will be apparent that considerable adjustment of the partition dimensions may be readily achieved. If desired, the ribs 58, 60, may be vertically disposed between the frame members, rather than horizontally as illustrated, the rib spacing is such as to provide an effective barrier for the animal being transported. It is not necessary to use set screws to affix the axial relationship of the ribs, however, they may be employed if desired.

The partition of FIG. 4 is supported within the vehicle in much the same manner as the partition of FIG. 1. Ears 62 are affixed to the tubular member 48 and insert member 52 to cooperate with brackets 28 as in FIG. 1. However, the adjustable nature of the partition eliminates the necessity for an adjustable clamp and therefore a clamp 64 of the type shown in FIG. 5 may be used. Clamp 64 is similar in form to the clamp 42 of FIG. 3 except that clamp 64 is attached directly to the frame member. As before two clamps are used, one being affixed to each of frame members 50 and 54. To insure engagement of clamp 64 with seat backing 34 a set screw 66 may be used to bear on the backing preventing the clamp from accidentally lifting off the seat back. If desired a similar set screw may be used with the clamp 42.

It is thus apparent that the invention provides an easily installed vehicle partition of attractive appearance which may be economically produced and distributed. Rearward visibility within the vehicle is not reduced yet passenger comfort and safety is obtained when transporting dogs or other animals in the vehicle. The partition does not interfere with the use of the vehicle and may be left in place permanently if desired.

It will be understood that various modifications other than the disclosed embodiments of the invention may be apparent to those skilled in the art and it is intended that the spirit and scope of the invention be defined only by the following claims.

I claim:

1. A removable vehicle partition for use with a vehicle having an upright rigid back cushion seat support having and upper edge comprising a generally planar frame of generally rectangular configuration having upper and lower side members and vertical end members, each of said side and end members being provided with an axially adjustable telescoping coupling, longitudinal rib members interconnecting said end members disposed parallel to said side members, each of said rib members being provided with an axially adjustable telescoping coupling, brackets affixed to the upper interior side portions of the vehicle, an ear affixed to each of said end members in opposed relation extending in the general plane of the frame adapted to rest within recess defined in said brackets, clamps mounted on said lower side member adapted to be affixed to the back cushion seat support upper edge and means selectively locking said axially adjustable couplings of said frame side and end members.

2. A removable vehicle partition for use with a vehicle having an upright rigid back cushion seat support having an upper edge comprising a generally planar frame having a lower horizontal member disposed substantially parallel to said upper edge, an upper member generally conforming to the vehicle inner roof panel and substantially vertical end members interposed between the lower and upper members, a barrier mounted across said frame, an ear mounted on each of said end members in opposed relation adjacent said upper member extending outwardly from said frame in the general plane thereof, a bracket affixed to each side of the upper interior portion of the vehicle vertically above said seat support upper edge, an upwardly open recess defined in each of said brackets receiving said ears whereby said frame is hung from said brackets and clamp members affixed to said lower frame member for gripping the upper edge of the back cushion seat support.

3. In a removable vehicle partition as in claim 2 wherein the seat support edge gripping portion of said clamp members is vertically adjustable with respect to said lower frame member.

References Cited in the file of this patent

UNITED STATES PATENTS

| | | |
|---|---|---|
| 1,746,349 | Hammond | Feb. 11, 1930 |
| 2,314,419 | Olson | Mar. 23, 1943 |
| 2,514,082 | Menrath | July 4, 1950 |
| 2,514,466 | Bildhaver | July 11, 1950 |
| 2,546,929 | Nampa | Mar. 27, 1951 |
| 2,560,106 | Held | July 10, 1951 |
| 2,595,329 | Brooks | May 6, 1952 |
| 2,720,414 | Hart | Oct. 11, 1955 |
| 2,733,952 | Wright et al. | Feb. 7, 1956 |
| 2,865,670 | Dunn | Dec. 23, 1958 |
| 2,884,279 | Halstead | Apr. 28, 1959 |

FOREIGN PATENTS

| | | |
|---|---|---|
| 219,431 | Great Britain | July 31, 1924 |
| 471,000 | Great Britain | Aug. 26, 1937 |
| 1,145,272 | France | May 6, 1957 |